United States Patent [19]

Ohmori et al.

[11] Patent Number: 4,492,250
[45] Date of Patent: Jan. 8, 1985

[54] FUEL TANK FOR MOTOR VEHICLES

[75] Inventors: Yoshitaka Ohmori; Hideaki Nebu, both of Saitama, Japan

[73] Assignee: Honda Giken Kogyo Kabushiki Kaisha, Tokyo, Japan

[21] Appl. No.: 486,914

[22] Filed: Apr. 20, 1983

[30] Foreign Application Priority Data

| Apr. 21, 1982 [JP] | Japan | 57-65399 |
| Apr. 21, 1982 [JP] | Japan | 57-56788[U] |
| Apr. 22, 1982 [JP] | Japan | 57-66214 |

[51] Int. Cl.³ .............................................. F17D 1/02
[52] U.S. Cl. ..................................... 137/590; 280/5 H
[58] Field of Search ..................... 137/590; 180/219; 280/5 A, 5 H

[56] References Cited

U.S. PATENT DOCUMENTS

| 1,569,114 | 1/1926 | Bond | 137/590 |
| 1,573,230 | 2/1926 | Donovan | 137/590 |
| 1,581,961 | 4/1926 | King | 137/590 |
| 1,595,569 | 8/1926 | Parsons | 137/590 |
| 2,095,875 | 10/1937 | Johnson | 137/590 |
| 3,679,092 | 7/1972 | Sullivan | 137/590 |
| 3,987,294 | 10/1976 | Carlson | 280/5 A |
| 4,385,676 | 5/1983 | Yoshimura | 280/5 A |

FOREIGN PATENT DOCUMENTS 52-10496 3/1977 Japan.
167517 12/1981 Japan .................................. 137/590

Primary Examiner—Alan Cohan
Assistant Examiner—John A. Rivell
Attorney, Agent, or Firm—Armstrong, Nikaido, Marmelstein & Kubovcik

[57] ABSTRACT

A fuel tank for motor vehicles of the type in which the rider rides the vehicle astride. A fuel cock is embedded in a concave portion formed in a body wall of the fuel tank, and a fuel suction pipe extends from the fuel cock into the tank, while a fuel pipe extends to the engine side located at the exterior of the tank. The fuel suction pipe and the fuel pipe can be brought into communication and out of communication with each other within the fuel cock. The position where the fuel cock is embedded in the body wall of the fuel tank may be at the upper surface of the tank, or alternatively it may be at a rear side of the tank.

Such arrangement can afford an extremely good operability of the fuel cock while the rider sits astride the vehicle body, and permits an easy confirmation of the operating knob switching position.

14 Claims, 19 Drawing Figures

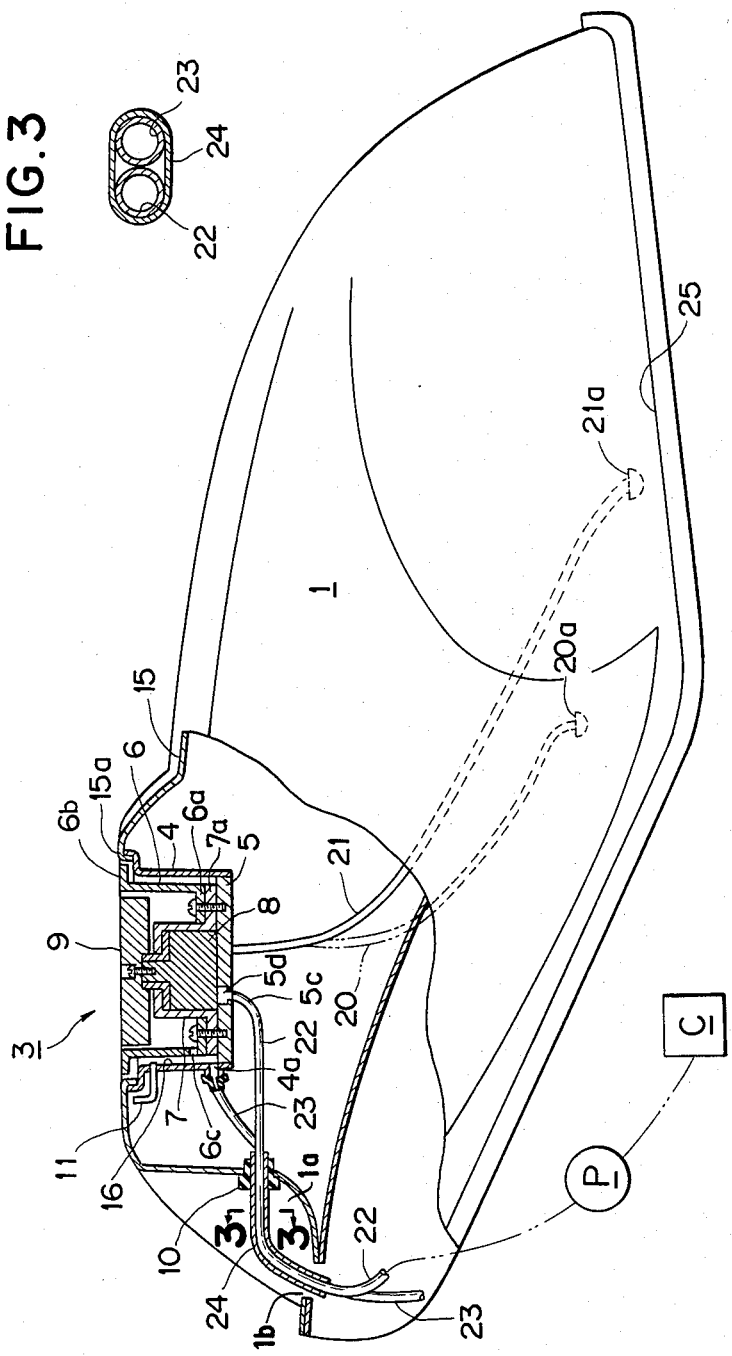

FUEL TANK FOR MOTOR VEHICLES

BACKGROUND OF THE INVENTION

1. Field of the Invention

The present invention relates to a fuel tank for motor vehicles and more particularly to a structure of a fuel cock in a fuel tank of a motor vehicle of the type in which the rider rides the vehicle astride such as a two- or three-wheeled motor vehicle.

2. Description of Relevant Art

In the conventional fuel tank of a motor vehicle of the type in which the rider rides the vehicle astride such as a two- or three-wheeled motor vehicle, a separate fuel cock is suspended from the exterior of the bottom plate and a fuel pipe is connected to the fuel cock for communication with the carburettor side, and the feed or cut-off of fuel with respect to the carburettor side is effected by opening or closing the fuel cock. It is desirable for the fuel cock to have a good operability because usually it is closed during parking or stopping and opened just before start of running.

SUMMARY OF THE INVENTION

According to the present invention there is provided a fuel tank for motor vehicles of the type in which the rider rides the vehicle astride, comprising a bottom wall, a tank body wall which defines a fuel storing space together with the bottom wall, a fuel feed port formed in the tank body wall, a concaved portion formed in the tank body wall, a fuel cock embedded in the concaved portion, a fuel suction pipe extending from the fuel cock into the fuel storing space, and a fuel pipe extending from the fuel cock to the engine side of the vehicle, in which the fuel suction pipe and the fuel pipe can be brought into communication and out of communication with each other in the interior of the fuel cock.

Accordingly, it is an object of the present invention to provide a fuel tank for motor vehicles including a fuel cock whose operability is very good when the rider rides the vehicle astride.

It is another object of the present invention to provide a fuel tank for motor vehicles which permits the rider to easily confirm the operating knob switching position as he rides the vehicle astride.

It is a further object of the present invention to provide a fuel tank for motor vehicles of a structure which permits the operating knob of a fuel cock to be designed as large as possible.

It is a still further object of the present invention to provide a fuel tank for motor vehicles superior in workability not requiring the fuel in the tank to be drawn out at the time of inspection of a fuel cock.

Other objects and advantages of the present invention will become apparent from the following detailed description of preferred embodiments of the present invention taken in connection with the accompanying drawings.

BRIEF DESCRIPTION OF THE DRAWINGS

FIG. 2 is a side view of the fuel tank partly in section taken on line 2—2 in FIG. 1 showing a principal portion including a fuel cock;

FIG. 3 is a sectional view taken on line 3—3 in FIG. 2;

DETAILED DESCRIPTION OF THE INVENTION

Figure 1:
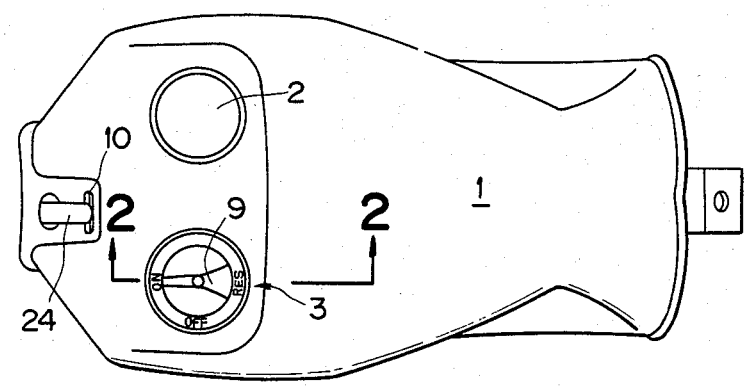
FIG. 1 is a plan view of a fuel tank according to a first embodiment of the present invention.

Referring first to FIGS. 1 and 2, there is shown a fuel tank 1 applicable to motor vehicles such as two- and three-wheeled motor vehicles, in which a fuel feed port with a tank cap 2 attached thereto and a fuel cock 3 are disposed side by side on the upper surface of the fuel tank 1.

The fuel cock 3 is disposed and fixed in a concave portion 16 which is formed by a cylindrical holder 4 and a cock base 5 integral with the cylindrical holder, the cylindrical holder 4 being fitted in an opening portion 15a integrally with a fuel tank body wall 15.

Onto the upper surface of the cock base 5 is fixed with screws a cock casing 7 together with a cylindrical cover member 6 through respective base end side flanges 7a and 6a. The cover member 6 is provided with a flange 6b at the other end side thereof. The flange 6b constitutes a dial ring on the surface of which are indicated an ON position, an OFF position and a reserve (RES) position of the cock 3. In the cock casing 7 is rotatably fitted a valve body 8 which has a curved concaved groove 8a formed in the bottom thereof and which is adapted to be rotated by an operating knob 9 threadedly engaged therewith.

Figure 4:
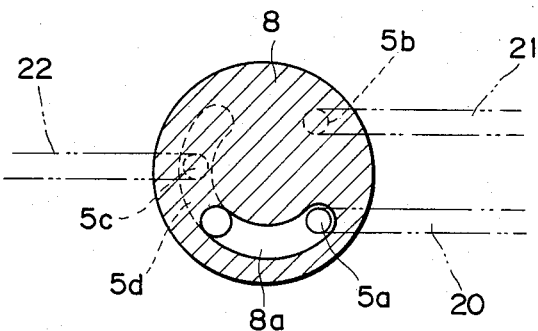
FIGS. 4 through 6 are transverse sectional views of the bottom of a valve body showing operation modes of the fuel cock, FIG. 4 showing a state of communication between the fuel tank and the carburettor side when a sufficient amount of fuel is present in the tank, FIG. 5 showing a like state when the fuel in the tank is running low, and FIG. 6 showing a cut-off state between the fuel tank and the carburettor side.
Figure 5:
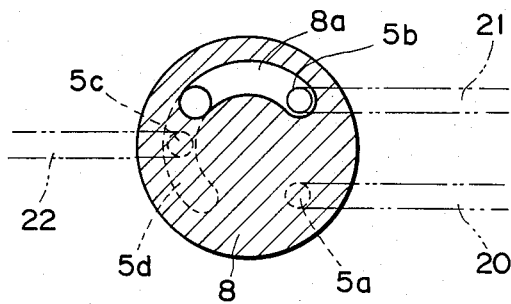
Figure 6:
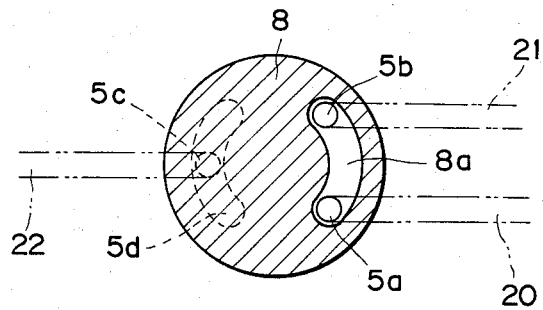
Figure 7:
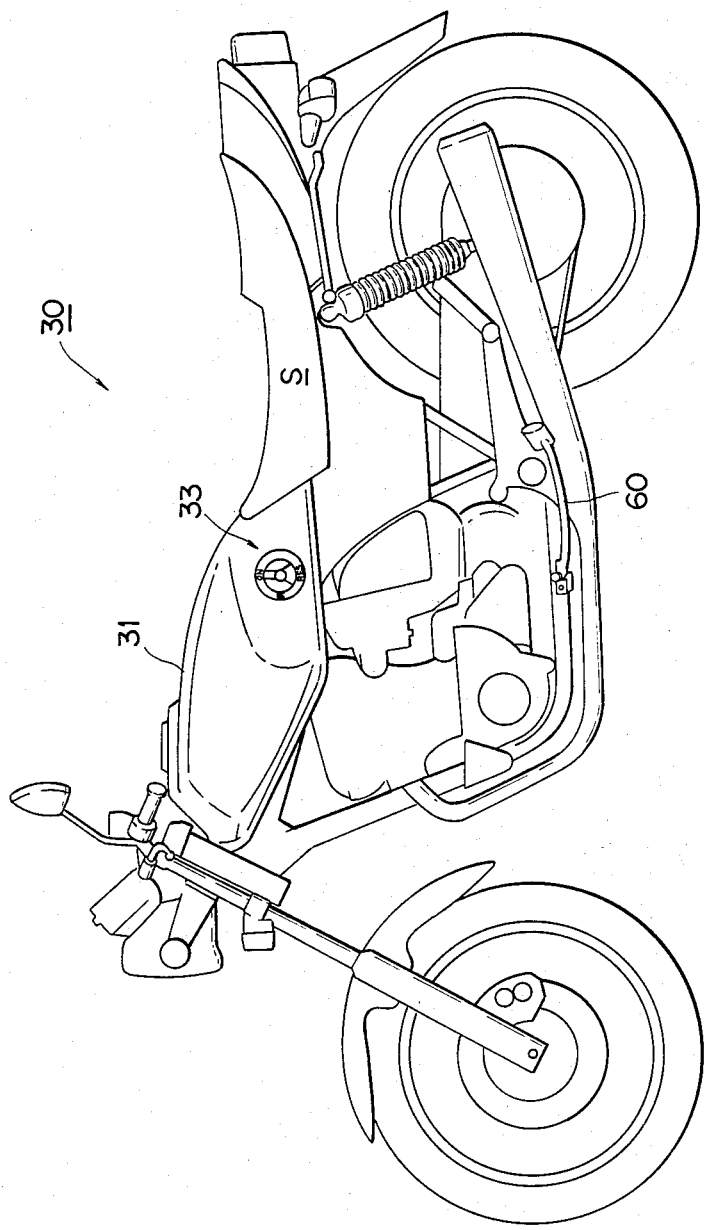
FIG. 7 is a side view of a two-wheeled motor vehicle equipped with a fuel tank according to a second embodiment of the present invention.

In the cock base 5 are formed openings 5a, 5b and 5c, and also a concaved groove 5d which partially overlaps the opening 5c is formed in the surface of the cock base 5 in contact with the valve body 8, as shown in FIGS. 4 through 6. The relation of the openings 5a, 5b, 5c and the concaved groove 5d to the concaved groove 8a of the valve body 8 is such that when the operating knob 9 is in the ON position, the openings 5a and 5c are communicating with each other through the concaved grooves 8a and 5d (see FIG. 4), and when the operating knob 9 is in the OFF position turned by 90-deg. from the ON position, the openings 5a and 5b are communicating with each other through the concaved groove 8a (see FIG. 6), and when the operating knob 9 is in the RES (reserve) position further turned by 90-deg., the openings 5b and 5c are communicated with each other through the concaved grooves 8a and 5d (see FIG. 5).

To the openings 5a, 5b and 5c are connected fuel suction pipes 20, 21 and a fuel pipe 22, respectively. The fuel suction pipe 21 is disposed so that a suction part 21a at the fore end thereof is close to a tank bottom plate 25, while a suction part 20a at the fore end of the fuel suction pipe 20 is disposed in a position higher by a predetermined level than the suction part 21a at the fore end of the fuel suction pipe 21. The fuel pipe 22 is connected to the suction side of an electromagnetic type fuel pump P. The fuel from the fuel pipe 22 is fed to a carburettor C by means of the pump P.

On the other hand, the cover member 6 is formed with a drain hole 6c in a position adjacent to the bottom plate, and the cylindrical holder 4 is also formed with a drain hole 4 in a position adjacent to the cock base 5. To the drain hole 4a is connected a drain pipe 23, which is conducted and opened to the exterior of the fuel tank 1.

The fuel pipe 22 and the drain pipe 23 are once conducted to the exterior of the fuel tank, more specifically, to a recessed portion 1a formed centrally in the front portion of the tank, in an air- and water-tight manner to prevent fuel leakage from the fuel tank, through a packing 10 while being inserted into a cover pipe 24, and then conducted downward through an opening 1b formed in the bottom wall of the recessed portion 1a. By the recessed portion 1a, the fuel pipe 22 and the drain pipe 23 are prevented from interfering with a head pipe positioned in front of the fuel tank.

To an upper part of the cylindrical holder 4 there may be attached an L-shaped breather pipe 11 for communication between the interior and exterior of the fuel tank, as shown in FIG. 2.

In the above-described construction, if the operating knob 9 of the fuel cock 3 is turned to the ON position as shown in FIG. 1, the openings 5a and 5c are communicating with each other (see FIG. 4) through the concaved groove 8a in the valve body 8 and the concaved groove 5d in the cock base 5, so that while the engine is in operation, fuel is fed to the carburettor C side through the fuel suction pipe 20 and fuel pipe 22.

When the fuel level has lowered to the position of the suction tip 20a of the fuel suction pipe 20—which can be confirmed from a change in the state of operation of the engine—as a result of consumption of the fuel in the fuel tank with vehicle running, if the operating knob 9 is turned by 180-deg. for switching to the RES (reserve) position, the openings 5b and 5c are communicated with each other through the concaved grooves 8a and 5d (see FIG. 5), with the result that the fuel (reserve fuel) corresponding to the difference in height between the suction tips 20a and 21a of the fuel suction pipes 20 and 21 is fed to the fuel pipe 22. In this state, it is possible to confirm from the position of the operating knob 9 that the reserve fuel is being consumed. This is effective in fuel replenishment.

Furthermore, if the operating knob 9 is set to the OFF position when the motor vehicle is to be parked, the concaved groove 8a in the valve body 8 and the openings 5a, 5b in the cock base 5 become opposed to each other, so that the fuel suction pipes 20, 21 and the fuel pipe 22 are disconnected from each other (FIG. 6).

In this embodiment, moreover, since the drain holes 6c and 4a are formed in the cover member 6 and cylindrical holder 4, respectively, rainwater or the like which has entered the cylindrical holder 4 is discharged to the exterior through the drain holes 6c, 4a and then through the drain pipe 23 without staying in the holder 4. Besides, if the drain holes 6c and 4a are formed on the same left side as a side stand (not shown) which is mounted on the left side of the vehicle body, drainage can be promoted by a left-hand inclination of the vehicle body during parking.

In the fuel tank according to this embodiment of the present invention, as will be apparent from the above description, the fuel suction pipes disposed in the fuel tank and the fuel pipe for supplying fuel from the fuel tank to the engine side are brought into interconnection through the fuel cock, and since the fuel cock is attached to the upper surface of the fuel tank, not only the operating knob switching position of the fuel cock can be easily confirmed but also the operability is so much improved; besides, it becomes easier to effect operation because this structure permits the use of the operating knob of a larger size.

In inspecting the fuel cock, moreover, it is not necessary to take the trouble to draw out the fuel in the tank, and thus a good operability is ensured.

A second embodiment of the present invention will be described hereinunder with reference to FIGS. 7 through 11.

To a rear side portion of a fuel tank 31 in a two-wheeled motor vehicle 30 is attached a fuel cock 33 integrally with a body wall 45 of the tank, and a recessed portion 47 is formed centrally at the rear end of the tank. A fuel pipe 52 is inserted into an opening A which is defined by a U-shaped notch 48a formed in a lower wall 48 of the recessed portion 47, the lower wall 48 being constituted by connection of the tank body wall 45 with the tank bottom wall 44, and a notch 49a formed in a tank fixing bracket 49 (see FIGS. 7 through 9).

The fuel cock 33 is disposed and fixed within a concave portion 46 which is formed in a rear left side of the fuel tank body. The concave portion 46 is formed by a cylindrical holder 34 provided integrally with a cock base 35 which holder 34 is integrally fitted in an opening portion formed in the fuel tank body wall 45 (see FIGS. 10 and 11).

Figure 11:
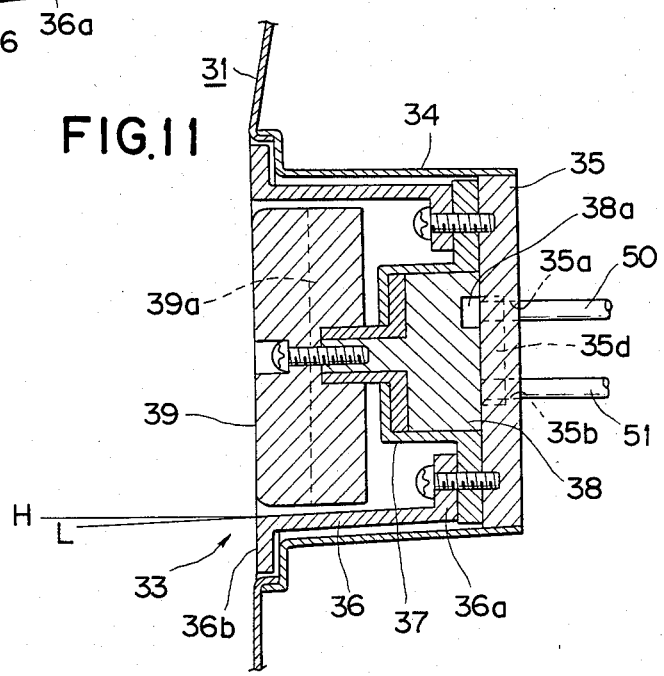
FIG. 11 is an enlarged longitudinal sectional view of only the fuel cock portion of FIG. 10.

Onto the surface of the cock base 35 on the outward side of the tank is fixed with screws a cock casing 37 together with a cover member 36 which is provided on its base end side with a fixing flange 36a and on the other end side with a dial ring 36b. A cylindrical wall surface of the cover member 36 is opened outwardly in the form of an inverted taper, and as shown in FIG. 11, an extension line L of the wall surface is somewhat inclined downward with respect to a horizontal line H. The wall surface of the cylindrical holder 34 is also tapered in the same form.

A valve body 38 having a curved concave groove 38a formed in the bottom thereof is fitted in the cock casing 37. The valve body 38 is capable of being rotated by a knob 39 integral with a disc 39a of a diameter somewhat smaller than the inside diameter of the dial ring 36b (see FIGS. 8 and 11).

A concaved groove 35d is formed in the surface of the cock base 35 in contact with the valve body 38. The relation between the concaved groove 35d of the cock base 35 and the concaved groove 38a of the valve body 38, as well as the relation of openings 35a and 35b formed in the cock base 35 and with fuel suction pipes 50 and 51 being connected thereto and an opening 35c (not shown) formed in the cock base 35 and with the fuel pipe 52 being connected thereto, to the concaved grooves 35d and 38a are as previously described in connection with the first embodiment.

The fuel pipe 52 used in this embodiment is drawn out through a packing 41 from an opening formed in the wall of the recessed portion 47 and is connected to the fuel pump suction side or to the carburettor C through opening A formed in an intermediate position between a pair of seat rails 42.

Figure 8:
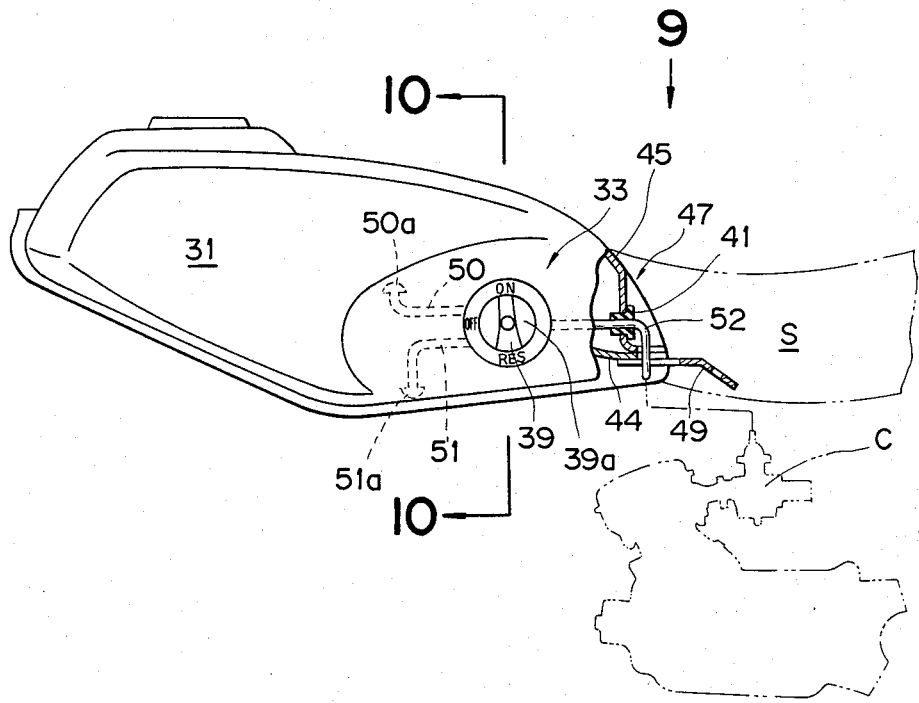
FIG. 8 is an explanatory view partly in section with a principal portion of the fuel tank shown in FIG. 7 being enlarged.
Figure 9:
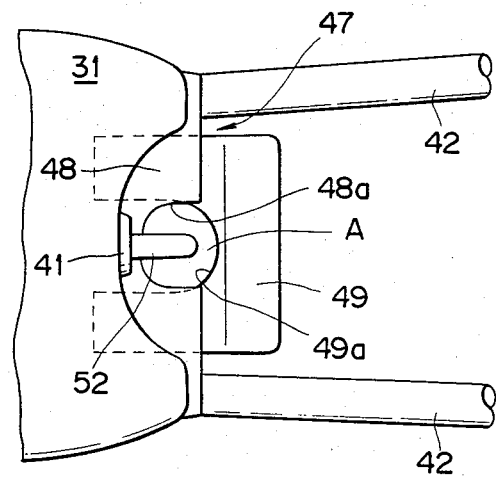
FIG. 9 is a plan view of only the rear portion of the fuel tank viewed from the direction of arrow 9 in FIG. 8.
Figure 10:
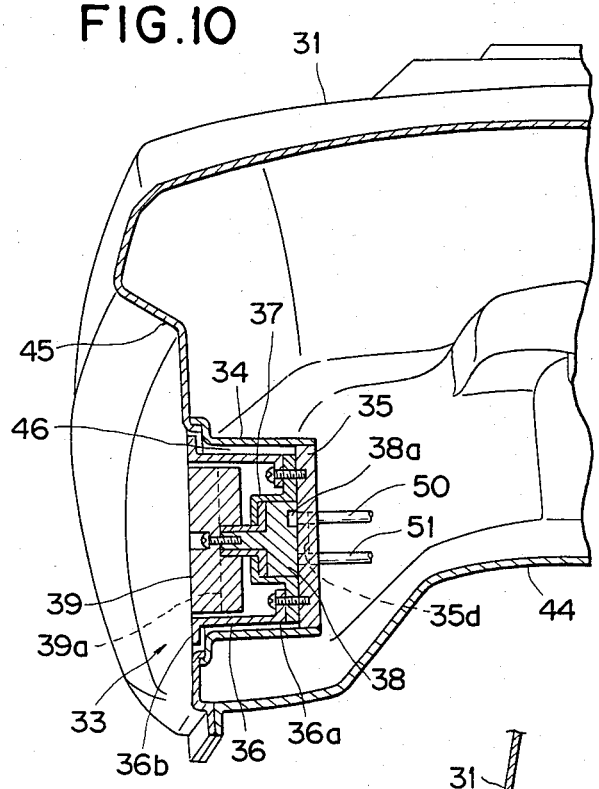
FIG. 10 is an enlarged longitudinal sectional view taken on line 10—10 in FIG. 8, showing only the fuel cock side of the fuel tank.

The ON and RES positions of the knob 39 are in a relation turned by 180-deg. with respect to each other as shown in FIG. 8, and both are opposed to each other in the vertical direction, so that the confirmation of position can be done easily by touching the knob 39.

According to this embodiment, as will be apparent from the above description, even if rainwater or the like enters the cover member 36 or the gap between the cover member and the cylindrical holder 34, it will be discharged easily to the exterior because the inner wall surface of the cylindrical holder 34 and that of the cover member 36 are outwardly divergent. Besides, since the fuel cock 33 is attached to the left side of the fuel tank 31, drainage can be done more effectively by a left-hand inclination of the tank during parking with a side stand 60.

Moreover, since the fuel cock 33 is attached to a rear part of the fuel tank 31 in a position close to a seat S, the rider can operate the fuel cock easily while sitting astride the seat S. Additionally, because the fuel cock 33 is attached to the surface of the fuel tank, the operating knob 39 can be enlarged structurally, and the operability is so much improved.

Furthermore, since the structure associated with the fuel pipe 52 is such that the fuel pipe 52 is drawn out to the recessed portion 47 from the interior of the tank, then conducted downward through the opening A and connected to the carburettor C (or the suction side of the fuel pump), it will never interfere with the openable seat S and so will never be compressed by the seat. Consequently, it is possible to thin the wall of the pipe or reduce the pipe diameter, whereby the reduction in weight of the vehicle body and the reduction of cost can be attained.

Besides, the external appearance is good because the exposed portion of the fuel pipe 52 is minimized.

Referring now to FIGS. 12 through 16, there is shown a structural modification of the fuel cock described in the above first embodiment. In the following description regarding this modification, a detailed explanation about the constituent members of the fuel cock corresponding to those described in the first embodiment will be omitted.

Figure 13:
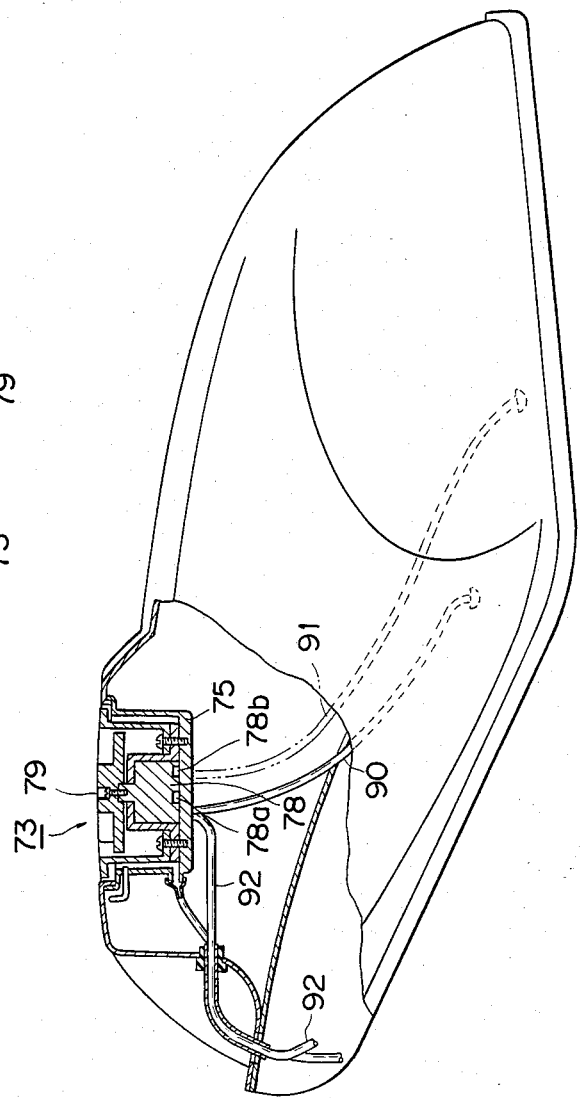
FIG. 13 is a side view of the fuel tank partly in section taken on line 13—13 in FIG. 12.

As shown in FIG. 13, a valve body 78 fitted in a cock casing 77 of a fuel cock 73 has a pair of curved concaved grooves 78a and 78b formed in the bottom thereof, while a cock base 75 does not have a concaved groove on its surface opposed to the valve body 78, it has three openings 75a, 75b and 75c in appropriate positions to which openings are connected fuel suction pipes 90, 91 and a fuel pipe 92, respectively.

The relation in arrangement between the paired concaved grooves 78a, 78b of the valve body 78 and the three openings 75a, 75b, 75c of the cock base 75 is as follows.

Figure 12:
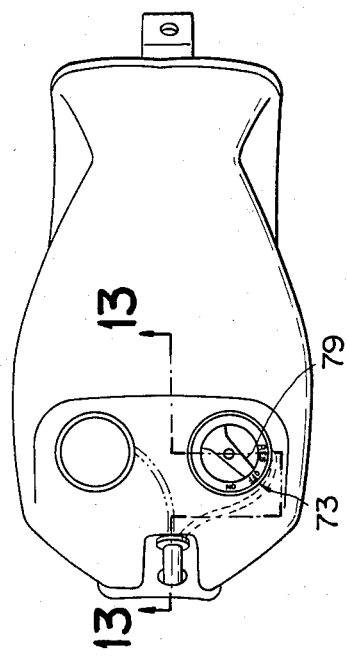
FIG. 12 is a plan view of a fuel tank including a fuel cock of a structure modified from its structure shown in the first embodiment of the present invention.
Figure 14:
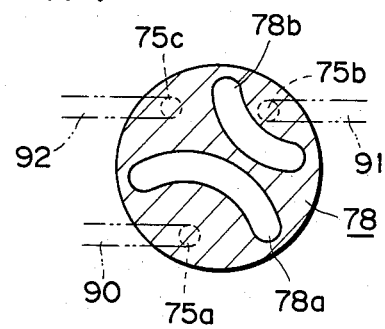
FIGS. 14 through 16 are transverse sectional views of the bottom of a valve body showing operation modes of the fuel cock of FIG. 12, FIG. 14 showing a cut-off state between the fuel tnak and the carburettor side, FIG. 15 showing a state of communication between the fuel tank and the carburettor side when a sufficient amount of fuel is present in the tank, and FIG. 16 showing a state of communication between the fuel tank and the carburettor side when the fuel in the tank is running low.
Figure 15:
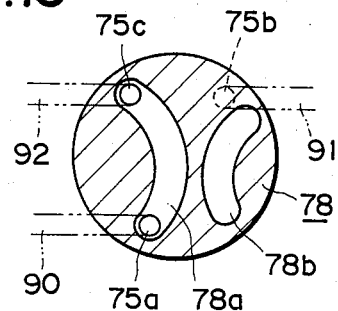
Figure 16:
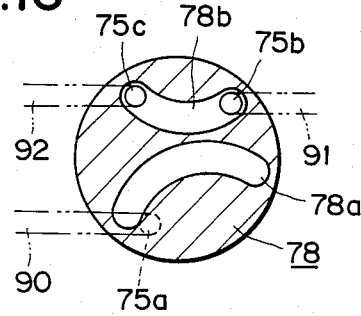

When an operating knob 79 shown in FIG. 12 is turned to OFF position, the concaved grooves 78a and 78b of the valve body 78 are not opposed to the openings 75a, 75b and 75c of the cock base 75, so that the fuel suction pipes 90, 91 and the fuel pipe 92 are disconnected from each other (see FIG. 14).

On the other hand, when the operating knob 79 is set to ON position by turning 45-deg. in a clockwise direction, the openings 75a and 75c are communicated with each other through the concaved groove 78a (see FIG. 15), so that during operation of the engine, fuel is fed to the carburettor through the fuel suction pipe 90 and fuel pipe 92 by means of the fuel pump.

Further, when the operating knob 79 is switched to RES (reserve) position, the openings 75b and 75c are brought into communication with each other through the concaved groove 78b (see FIG. 16), so that fuel (reserve fuel) in an amount corresponding to the difference in height between the fore end of the fuel suction pipe 90 and that of the fuel suction pipe 91 in the fuel tank is fed to the fuel pipe 92.

Figure 17:
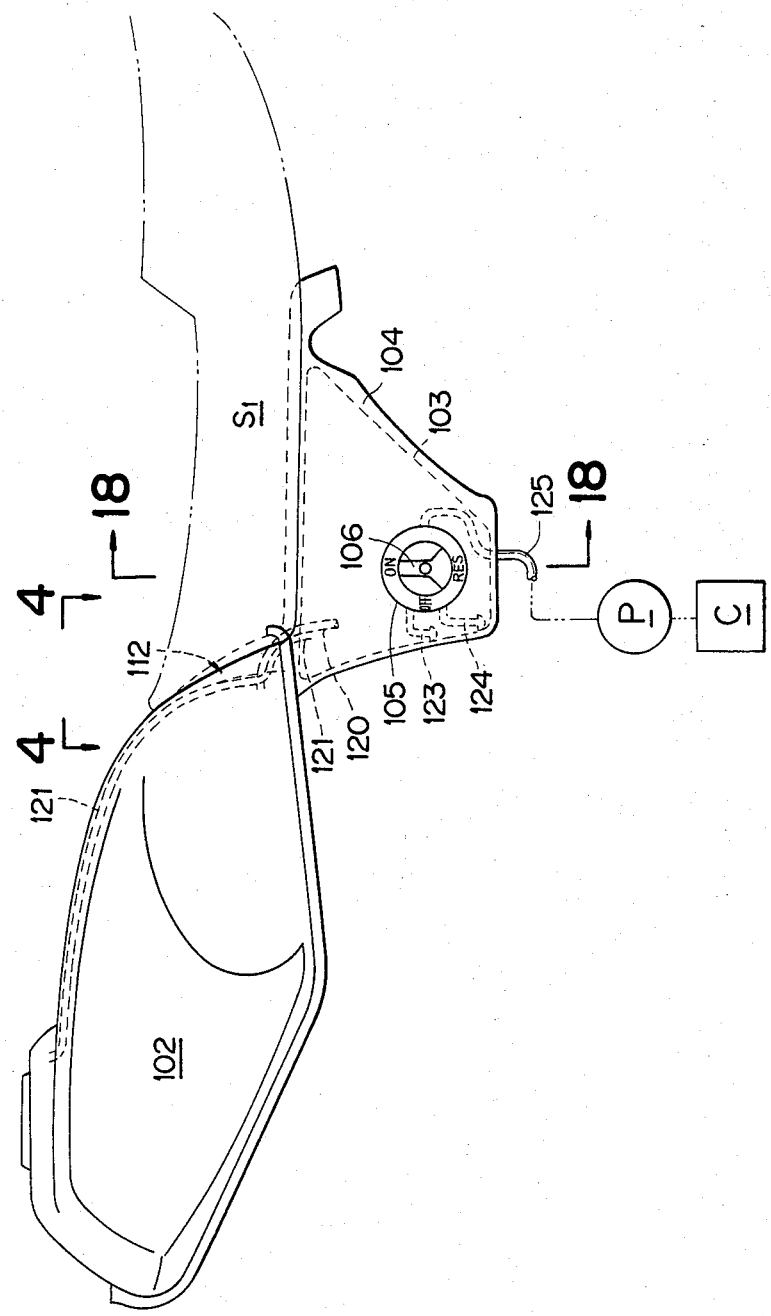
FIG. 17 is an explanatory side view of a fuel tank according to a further embodiment of the present invention.
Figure 18:
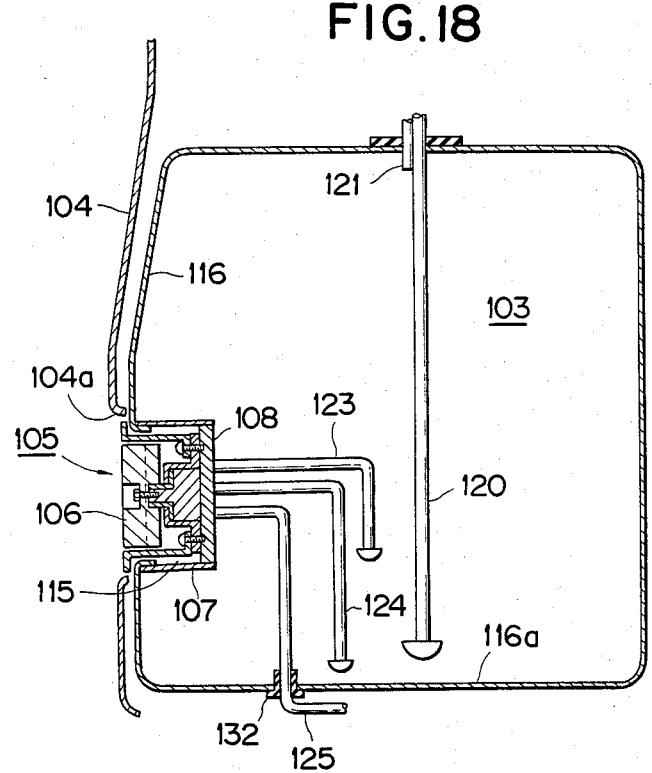
FIG. 18 is a sectional view of a sub-tank portion taken on line 18—18 in FIG. 17.
Figure 19:
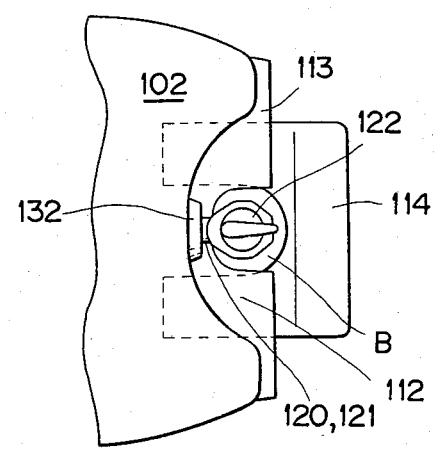
FIG. 19 is a plan view of only the rear portion of a main fuel tank viewed from the direction of arrow 19 in FIG. 17.

Referring now to FIGS. 17 through 19, there is shown a further embodiment of the present invention, in which the motor vehicle to which the present invention is applied is provided with a sub-tank in addition to the ordinary fuel tank for increasing the tank capacity, and a fuel cock is attached to the surface of the sub-tank.

In FIG. 17, a sub-tank 103 is mounted in a position from below the rear portion of a main fuel tank 102 to below an openable seat S₁. A fuel cock 105 is attached to the left-hand surface of the sub-tank 103 integrally therewith, and an operating knob 106 of the fuel cock 105 is fitted in an opening 104a formed in a side cover 104 which covers the sub-tank 103 so that the operating knob 106 is substantially flush with the side cover 104 (see FIG. 18).

Furthermore, as shown in FIG. 19, a recessed portion 112 is formed centrally at the rear portion of the main tank 102, in which is disposed a main tank cock 122 as will be described later. A later-described connecting pipe 120 drawn out from the main tank 102 and a breather pipe 121 are conducted downward through the main tank cock 122 and further through an opening B which is defined by a lower wall 113 of the recessed portion 112 and a tank fixing bracket 114. The connecting pipe 120 is connected to the sub-tank 103 so that the fuel in the main tank 102 may be fed into the sub-tank 103. The breather pipe 121 is connected between the main tank 102 and the sub-tank 103 for communication between the upper spaces in both tanks.

The fuel cock 105 is disposed and fixed in a concave portion 115 formed in the body of the sub-tank 103. The concave portion 115 is defined by a cylindrical holder 107 provided integrally with a cock mounting base 108 which cylindrical holder 107 is integrally fitted in an opening portion formed in a sub-tank body wall 116 (see FIG. 18).

The structure of the fuel cock 105 per se is the same as that described in the foregoing first and second embodiments, and to the cock mounting base 108 are connected fuel suction pipes 123, 124 and a fuel pipe 125 like the two previous embodiments. The fuel pipe 125 is drawn out to the exterior of the sub-tank through a packing 132 from an opening formed in a sub-tank bottom plate 116a and is connected to the suction side of an electromagnetic type fuel pump P. Further, the discharge side of the fuel pump P is connected with a pipe to a carburettor C.

In the above-described construction, if the operating knob 106 of the fuel cock 105 is turned to ON position as shown in FIG. 17 in an opened state of the main tank cock 122, fuel is fed to the carburettor side through the fuel suction pipe 123 and fuel pipe 125 by means of the fuel pump P during operation of the engine. As the fuel is discharged from the sub-tank 103, the fuel in the main tank 102 is supplied to the sub-tank 103 through the connecting pipe 120. If the operating knob 106 is turned 180-deg. into RES (reserve) position, the fuel in the bottom portion of the sub-tank is fed to the fuel pipe 125 through the fuel suction pipe 124. Further, if the operating knob 106 is set to OFF position, the discharge of the fuel in the sub-tank 103 to the fuel pipe 125 is stopped.

Moreover, during inspection and servicing of the sub-tank 103 or fuel cock 105, if the main tank cock 122 is kept closed, it is not necessary to take the trouble to draw out the fuel in the main tank 102, and this is convenient.

Additionally, the connecting pipe 120 and the main tank cock 122 are not likely to interfere with the seat $S_1$ because they are disposed in the recessed portion 112 of the main tank 102.

Since in this embodiment the fuel cock 105 is positioned below the seat $S_1$, the rider can operate the cock easily while sitting astride the seat. Further, since the fuel tank 105 is attached to the surface of the subtank, it is structurally possible to enlarge the operating knob 105, and a good operability is thereby attained. Besides, it is not likely at all that the rider's foot in a riding posture will touch the operating knob 106, because the operating knob is substantially flush with the side cover 104.

What is claimed is:

1. A fuel tank for motor vehicle of the type in which the rider rides the motor vehicle astride, comprising:
   a bottom wall;
   a tank body wall which, together with said bottom wall, defines a fuel storing space;
   a fuel feed port formed in said tank body wall;
   a concave portion formed in said tank body wall;
   a fuel cock embedded in said concave portion;
   a fuel suction pipe extending from said fuel cock into said fuel storage space; and
   a fuel pipe extending from said fuel cock to the engine side of the motor vehicle,
   in which said fuel suction pipe and said fuel pipe can be brought into communication and out of communication with each other in the interior of said fuel cock.

2. A fuel tank according to claim 1, wherein said concave portion with said fuel cock embedded therein is formed by a cylindrical holder fixed integrally to said tank body wall and a fuel cock mounting base connected integrally with said cylindrical holder.

3. A fuel tank according to claim 2, wherein said fuel cock comprises a casing fixed removably to said mounting base, a valve body rotatably fitted in said casing, and an operating knob connected to said valve body so that it can rotate said valve body.

4. A fuel tank according to claim 3, wherein said fuel cock is further provided with a cylindrical member connected to said mounting base together with said casing, said cylindrical member being provided integrally with a dial ring positioned around said operating knob.

5. A fuel tank according to claim 3, wherein said valve body of said fuel cock has a first, curved, concaved groove formed in the bottom thereof.

6. A fuel tank according to claim 5, wherein said fuel cock mounting base of said concave portion is formed with a first and a second opening which can be connected with said fuel suction pipe and said fuel pipe, respectively, and said mounting base is further provided with a second concaved groove formed on its surface which communicates with said second opening.

7. A fuel tank according to claim 6, wherein said first concaved groove of said valve body and said second concaved groove of said cock mounting base both can be brought into communication with each other by rotation of said valve body through operation of said operating knob, and said first and said second opening can be brought into communication with each other upon communication between said first and said second concaved groove.

8. A fuel tank according to claim 6, wherein said fuel suction pipe comprises a first suction pipe and a second suction pipe, the fore end of said first suction pipe being disposed in a position close to said bottom wall of said fuel tank, and the fore end of said second suction pipe being disposed in a position higher by a predetermined height than the fore end of said first suction pipe.

9. A fuel tank according to claim 8, wherein said first and second suction pipes are connected respectively to two said first openings formed in said cock mounting base, are capable of communicating through said first and said second concaved groove of said valve body with said fuel pipe connected to said second opening selectively in accordance with the rotation of said valve body.

10. A fuel tank according to any one of claims 1–9, wherein said concave portion with said fuel cock embedded therein is formed in the portion of said tank body wall which constitutes an upper surface of said fuel tank.

11. A fuel tank according to any one of claims 1–9, wherein said concave portion with said fuel cock embedded therein is formed in the portion of said tank body wall which constitutes a rear side of said fuel tank.

12. A fuel tank according to claim 11, wherein said cylindrical member connected to said mounting base of said fuel cock is divergent toward the outside.

13. A fuel tank according to claim 11, wherein said fuel tank is provided at the rear end thereof with a recessed portion formed nearly centrally in its width direction, and said fuel pipe is drawn out from the interior of said fuel tank into said recessed portion and then extended up to the engine side of the motor vehicle.

14. A fuel tank according to claim 13, wherein said recessed portion at the rear end of said fuel tank has a bottom wall in which is formed an opening, and said fuel pipe is inserted through said opening of said bottom wall.

* * * * *